United States Patent [19]
Bassett

[11] Patent Number: 5,603,269
[45] Date of Patent: Feb. 18, 1997

[54] MECHANISM FOR PLANTING AGRICULTURAL SEED

[75] Inventor: James H. Bassett, Sycamore, Ill.

[73] Assignee: Dawn Equipment Company, Sycamore, Ill.

[21] Appl. No.: 536,676

[22] Filed: Sep. 29, 1995

Related U.S. Application Data

[63] Continuation of Ser. No. 189,840, Feb. 1, 1994, Pat. No. 5,476,051.

[51] Int. Cl.$^6$ .......................... A01B 5/00; A01B 49/04; A01C 5/00
[52] U.S. Cl. ........................ 111/52; 111/140; 111/164; 111/167; 111/179; 111/924
[58] Field of Search ............................ 111/139, 140, 111/924, 161, 163, 164, 167, 170, 179, 52, 183, 184, 185, 14

[56] References Cited

U.S. PATENT DOCUMENTS

| | | | |
|---|---|---|---|
| 1,247,744 | 11/1917 | Trimble | 111/81 |
| 2,014,334 | 9/1935 | Johnson | 111/170 X |
| 2,799,234 | 7/1957 | Chancey | 111/109 |
| 3,065,879 | 11/1962 | Jennings et al. | 111/170 X |
| 4,280,419 | 7/1981 | Fischer | 111/179 X |
| 4,596,200 | 6/1986 | Gafford et al. | 111/164 X |
| 4,785,890 | 11/1988 | Martin | 111/52 X |
| 4,930,431 | 6/1990 | Alexander | 111/164 X |
| 5,092,255 | 3/1992 | Long et al. | 111/170 X |

OTHER PUBLICATIONS

Case Corporation Brochure ©1995 Case Corporation.
Case IH Corporation Brochure ©Product Information—Aug., 1986.

Primary Examiner—Dave W. Arola
Assistant Examiner—Christopher J. Novosad
Attorney, Agent, or Firm—Arnold, White & Durkee

[57] ABSTRACT

A mechanism for planting agricultural seed. The mechanism has a frame to be drawn by a towing vehicle in a forward direction, a seed supply hopper on the frame, structure on the frame for directing seed from the hopper to a delivery point adjacent to a surface on underlying soil into which seed is to be planted, structure on the frame for pressing seed from the seed directing structure into underlying soil adjacent to the delivery point as the frame moves in the forward direction, and cooperating first and second soil parting structures on the frame for defining a receptacle for seed at the delivery point.

33 Claims, 3 Drawing Sheets

MECHANISM FOR PLANTING AGRICULTURAL SEED

This application is a continuation of application Ser. No. 08/189,840, filed Feb. 1, 1994, now U.S. Pat. No. 5,476,051.

BACKGROUND OF THE INVENTION

1. Field of the Invention

This invention relates to agricultural equipment and, more particularly, to a mechanism for continuously planting seed in soil.

2. Background Art

There are a myriad of different apparatus available for continuously planting seed in soil One objective of designers of such apparatus is to consistently and accurately place the seed at prescribed intervals and depths to get uniform crop yield.

John Deere currently offers a complete planter unit with a metering mechanism thereon. The metering mechanism uses rotary disks with seed receptacles thereon with a source of vacuum to draw the seed into the receptacles. The seeds separate from the disks at a predetermined rotational position therefor and fall by gravity through a chute to be directed thereby into a seed slot.

The seed is released sufficiently above the ground that it often bounces and ultimately lands at a location spaced from an intended site. Further, since the seed is released above the soil, there is a tendency of the seed to be moved undesirably by wind or even the draft of the moving equipment before the seed comes to rest in the soil. As a result, significant mounts of the seed may be spaced erratically so that the seed receives less than consistent benefit from the nutrients in the soil and additives that may be placed by the farmer on and into the soil.

One seed planting mechanism, offered by Kongskilde, a Denmark corporation, alleviates the above problem to a certain extent by propelling seed downwardly and thereafter pressing the seed into the soil. However, the Kongskilde system has other limitations, as are made apparent below.

SUMMARY OF THE INVENTION

According to the invention, a mechanism is provided for planting agricultural seed. The mechanism has a frame to be dram by a towing vehicle in a forward direction, a iced supply hopper on the frame, structure on the frame for directing seed from the hopper forcibly to a delivery point adjacent to a surface on underlying soil into which seed is to be planted, structure on the frame for pressing seed from the seed directing structure into underlying soil adjacent to the delivery point as the frame moves in the forward direction, and cooperating first and second soil parting structures on the frame for defining a receptacle for seed at the delivery point.

With the inventive structure, seed can be consistently place in soil at desired spacing and depth in a continuous planting operation.

The seed directing structure can include a metering structure for directing seed to the delivery point at predetermined intervals.

The seed directing structure can include a conduit for communicating seed from the hopper to the delivery point. An intermediate deflector plate can be provided to intercept seed from the conduit and guide it to the delivery point.

Positive seed placement is facilitated by pressurizing the internal hopper space to force the seed through the conduit.

The seed can be pressed into the soil by a number of different structures. In one form, a convex surface is provided to move along the underlying soil and contact the seed and thereby press the seed into the soil. The structure for pressing the seed can be in the form of a wheel that is independently driven or rotated as it is drawn over the underlying soil.

In one form, the first and second cooperating soil parting structures consist of first and second rotatable wheels with a fore and aft extent. In one form, the delivery point lies within the fore and aft extent of the first and second rotatable wheels.

Structure can be provided downstream of the delivery point for continuously depositing soil over the seed that is pressed into the underlying soil.

To enhance seed placement, structure can be provided upstream of the first and second cooperating soil parting structures for assisting residue resituation accomplished by the first and second soil parting wheels.

The residue clearing structure can include a wheel that is rotatable about a horizontal axis at right angles to a line of forward frame movement and/or at least one toothed wheel that is rotatable about an axis that is non-perpendicular to the line of movement of the frame.

In one form, the seed planting mechanism has an associated linkage for connecting the frame to a drawing frame for floating movement relative thereto.

A second seed planting mechanism can be provided to be mounted to a drawing frame so that the separate seed planting mechanisms are movable relative to each other and to a common mounting frame.

It is also possible to have one hopper feeding two or more of the agricultural seed planting mechanisms.

In another form of the invention, a mechanism is provided for planting agricultural seed, which mechanism has a frame to be drawn by a towing vehicle in a forward direction, structure on the frame for directing seed from a supply to a delivery point adjacent to a surface on underlying soil into which seed is to be planted, structure on the frame upstream of the delivery point for shielding seed directed to the delivery point, and structure on the frame upstream of the shielding structure for clearing residue in an intended line along which seed is to be pressed into underlying soil as the frame is advanced in a forward direction.

DETAILED DESCRIPTION OF THE DRAWINGS

Figure 7:
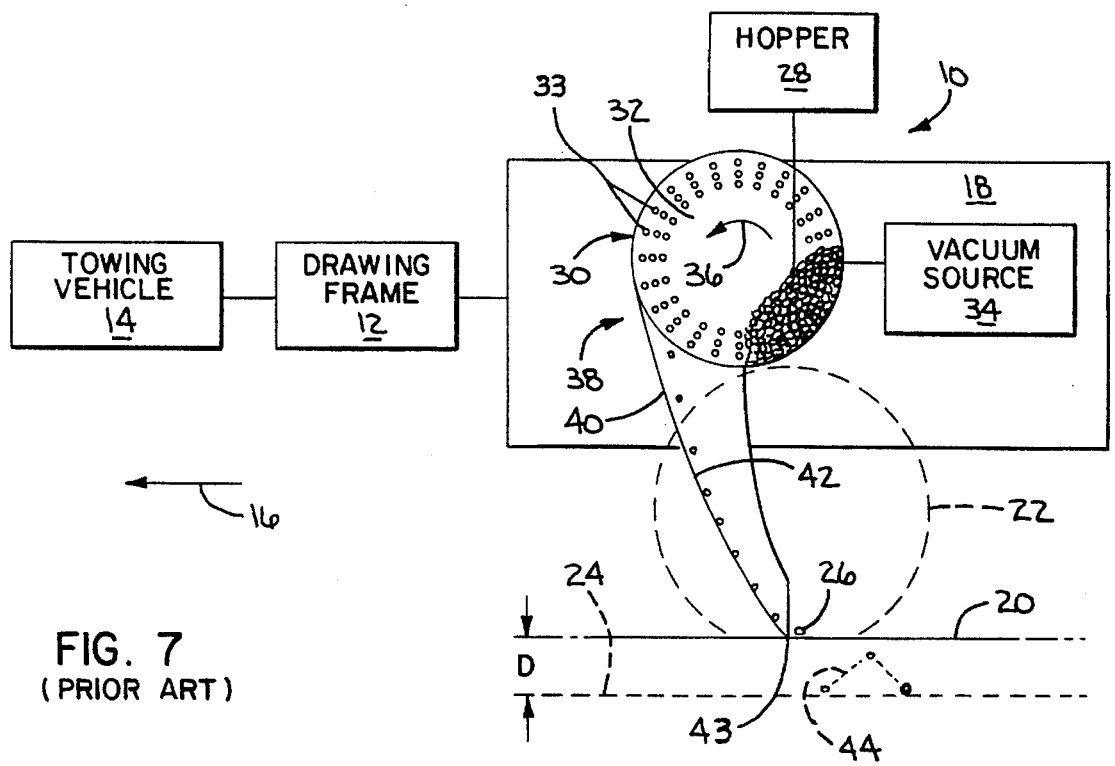
FIG. 7 is a schematic side elevation view of another prior art mechanism for planting agricultural seed.

In FIG. 7, one known seed planting mechanism is shown at 10. The seed planting mechanism 10 is currently being offered by John Deere and is the same system described above. More particularly, a plurality of the mechanisms 10 would be mounted in laterally spaced relationship upon a common drawing frame 12 to continuously plant a plurality of rows equal to the number of mechanisms 10. The towing vehicle 14 attaches to the drawing frame and draws the drawing frame 12 and mechanisms 10 in a forward direction, as indicated by the arrow 16.

Each mechanism 10 has a frame 18 that is movable along underlying soil 20 at predetermined height through a pair of gauge wheels 22 (one shown). Other elements which are normally on the John Deere mechanism 10 have been omitted for purposes of clarity. It suffices to say that one of these other mechanisms defines a seed slot 24, having a predetermined depth D, at the bottom of which the individual seeds 26 are placed. Closing wheels are placed a significant distance downstream of the point at which the seed 26 first contacts the bottom of the slot 24.

The frame 18 supports a hopper 28 for a supply of seed 26. The hopper 28 feeds a metering device 30 having a rotatable, flat plate 32 with rings of a circumferentially spaced seed receptacle 33 thereon. A vacuum source 34 draws seed from an accumulated seed supply 36 in the metering device 30 into the seed receptacles 33. As the plate 32 rotates in a counterclockwise direction, as indicated by the arrow 36, the seeds 26 in the receptacles 33 travel around to approximately the location indicated at 38 at which point they separate from the disk 32 and fall under their own weight into a chute 40.

The chute 40 has a concave surface 42 opening in a trailing direction. Seed 26 departing from the disk 32 is guided by the surface 40 in a curved path until it separates from the surface 42 at the bottom end 44 thereof.

The seed 26 separates from the chute 40 approximately at the level of the underlying soil 20 and falls by gravity a distance D to the bottom of the slot 24. In hard soil, the seed 26 may bounce, as shown by the path in dotted lines 44 in FIG. 7, and/or may be entrained in moving air caused by windy conditions or the draft of the moving equipment.

Figure 6:
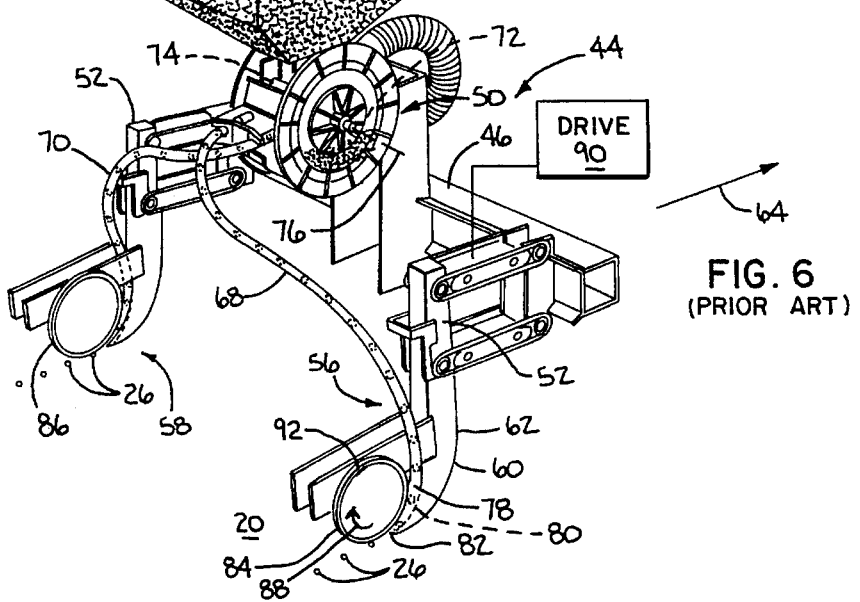
FIG. 6 is a perspective view of a prior art mechanism for planting agricultural seed.

The other prior art system, as described above and offered by Kongskilde in Denmark, is shown in FIG. 6 at 44. The system 44 includes a frame 46 to which a hopper 48 and metering mechanism 50 are attached. The frame 46 branches from the hopper 48 into two laterally spaced legs 52, each of which supports a seed placement assembly 56, 58.

The exemplary seed placement assembly 56 includes a curved shoe 60 with a leading convex edge 62 that wedges through the underlying soil 20 as the frame 46 is advanced in a forward direction, as indicated by the arrow 64.

The internal hopper space 66 is pressurized so that seed 26 in the hopper 48 is forcible discharged from the metering mechanism 50 through spaced conduits 68, 70 associated with the seed placement assemblies 56, 58, respectively.

The metering mechanism 50 consists of laterally spaced, plates 72, 74 which are rotatable about a laterally extending shaft 76 to cause release of the seed 26 at predetermined intervals through the conduits 68, 70.

The exemplary conduit 68 has an outlet end 78 which delivers seed 26 from the hopper 48 substantially in a downward direction against a parabolic deflecting surface 80, which opens in a trailing direction. The deflecting surface 80 guides the seed 26 in a curved path to its rear extremity 82 at which point the seed 26 separates and is propelled into the underlying soil 20.

The deposited seed 26 is immediately contacted by a stainless steel press wheel 84 which firmly embeds the seed 26 in the soil 20. The wheel 84, like the counterpart wheel 86 on the opposite side of the frame 46, is rotated in the direction of the arrow 88 by an appropriate drive 90, at a velocity such that the peripheral surface 92 which engages the underlying soil 20 travels at the same speed as the vehicle drawing the system 44.

Figure 1:
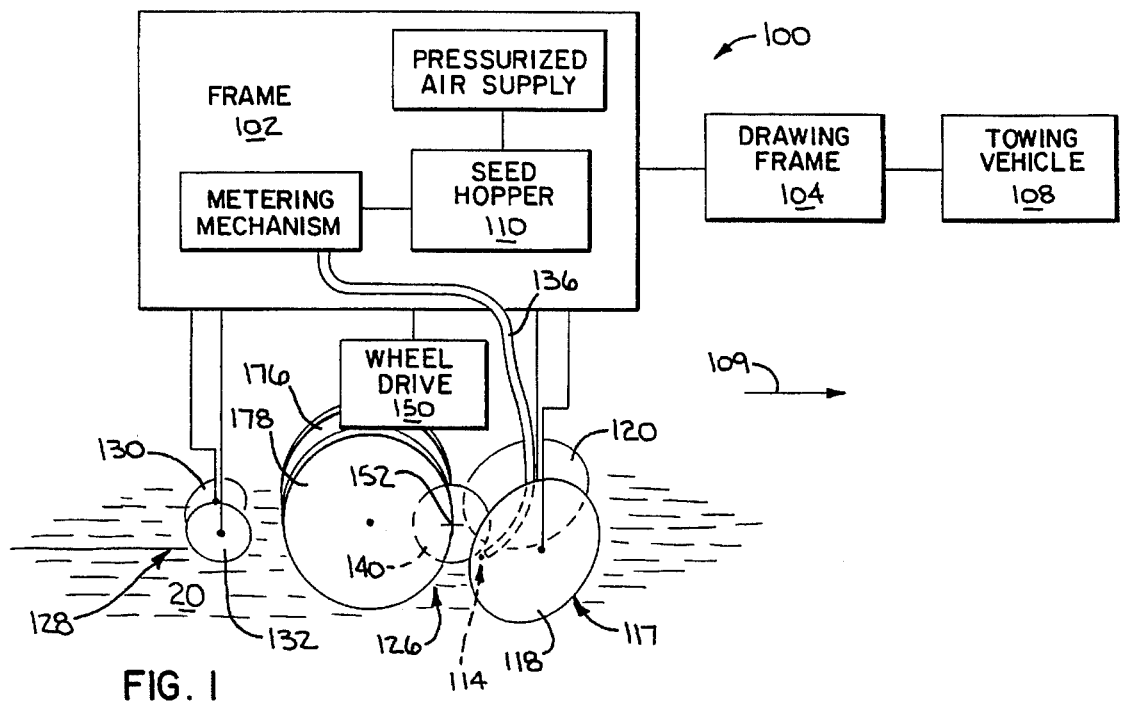
FIG. 1 is a schematic perspective view of a mechanism for planting agricultural seed according to the present invention.
Figure 2:
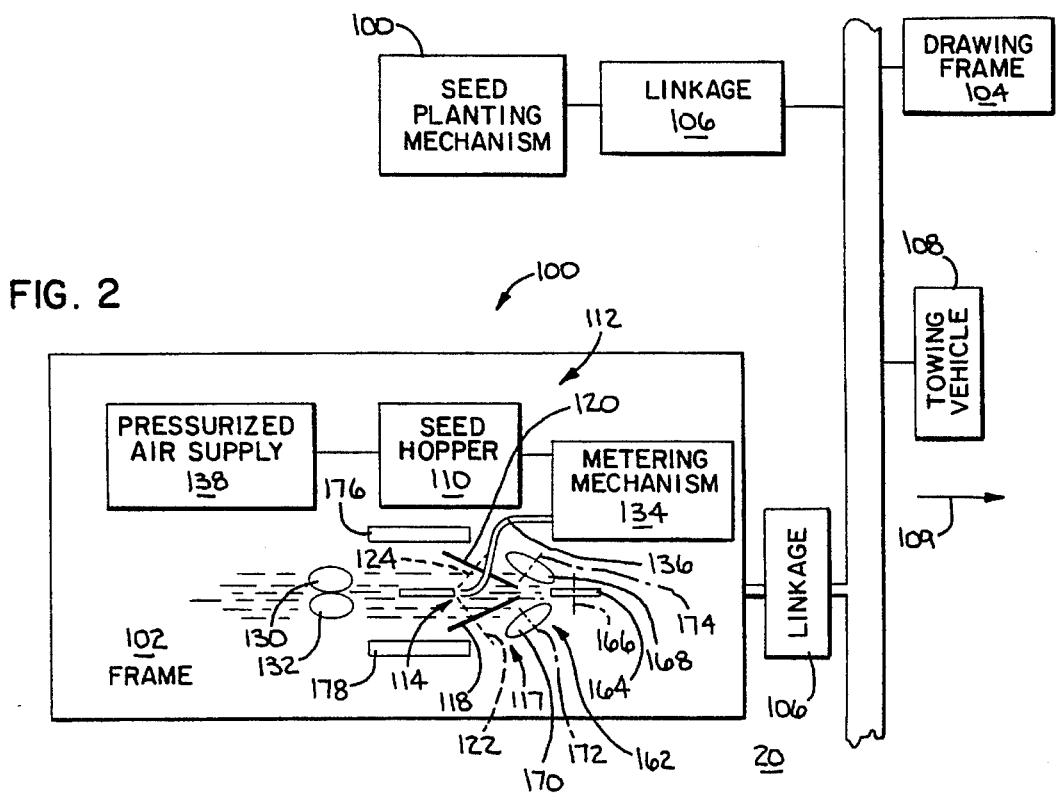
FIG. 2 is a schematic plan view of a planting system, including multiple mechanisms for planting agricultural seed, according to the present invention, including a modified form thereof.
Figure 3:
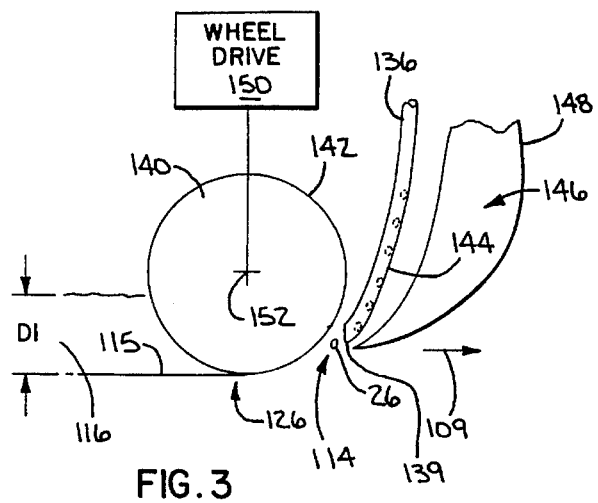
FIG. 3 is a fragmentary side elevation view of structure on the inventive planting mechanism for directing seed from a supply into underlying soil and pressing the seed into underlying soil.
Figure 4:
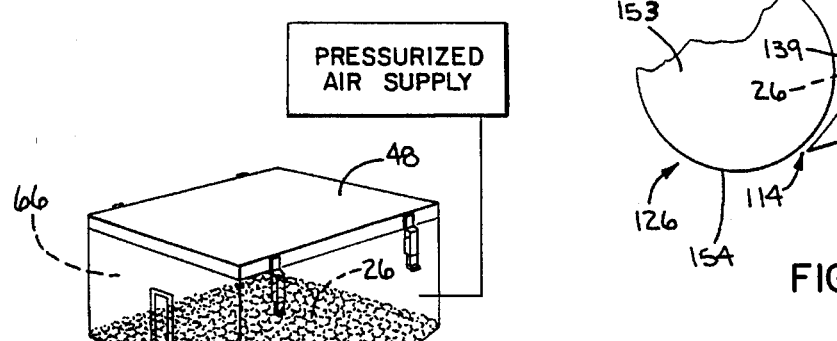
FIG. 4 is a view as in FIG. 3 of a modified form of structure for directing seed from a supply into underlying soil and pressing the seed into underlying soil.
Figure 5:
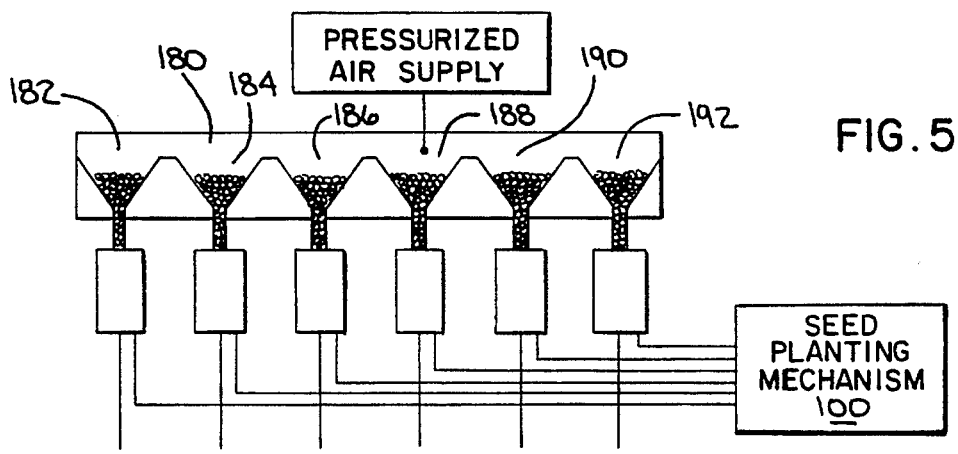
FIG. 5 is a schematic plan view of a plurality of mechanisms for planting agricultural seed, according to the present invention, including a single hopper.

The inventive mechanism for planting agricultural seed is shown at 100 in FIGS. 1–5. The seed planting mechanism 100 includes a frame 102, which is attached to a drawing frame 104 through a linkage 106 to be advanced by a towing vehicle 108 in a forward direction, as indicated by the arrow 109. One, or a plurality, of the mechanisms 100 can be attached to the drawing frame as shown in FIGS. 2 and 5.

A hopper 110 is provided on the frame 102 to contain a supply of seed 26 to be planted. Means 112 is provided for directing seed from the hopper 110 forcibly to a delivery point 114 adjacent to the bottom surface 115 of a seed slot 116. The seed slot 116, which has a depth D 1 (FIG. 3 ), defines a receptacle for the seed 26.

The seed slot 116 is defined by a means at 117, which means 117 includes cooperating first and second soil parting wheels 118, 120. The soil parting wheels 118, 120 are rotatable about transverse, substantially horizontally extending axes 122, 124. The wheels 118, 120 diverge in a trailing direction and are relatively positioned so that they cooperatively part the underlying soil 20. A suitable arrangement of such wheels 118, 120 is known in the art and is commonly characterized as a V-opener.

Additional means 126 is provided on the frame 102 for pressing seed 26 at the delivery point 114 into the underlying soil 20.

Downstream of the means 126, a slot closing means is provided at 128. The slot closing means 128 consists of a pair of cooperating closing wheels or disks 130, 132, which rotate about non-parallel axes. Suitable closing wheels 130, 132 are well known in the art. Applicant's own TRASH-WHEELS® residue resituating wheels could also be mounted to the frame 102 in the same orientation to close the slot 116 and place a blanket of loosened soil over the seed 26.

More particularly, the means 112 includes a metering mechanism 134 which causes the delivery of seed 26 at predetermined intervals through a seed conduit 136 communicating between the metering mechanism 134 and the delivery point 114. This arrangement gives the flexibility to place seed regularly at small intervals, as with a conventional drill.

It is preferred that seed 26 be propelled positively against the soil 20 at the bottom of the slot 116. To accomplish this, a pressurized air supply 138 is attached to the frame 102 and cooperates with the seed hopper 110 and/or metering mechanism 134 to produce a positive pressure therein and in the conduit 136 so that the seed 26 moves through, and parts from the free end 139 of the conduit 136 at a considerable velocity, which causes the seed 26 to be virtually unaffected by existing wind conditions or the draft of the moving equipment.

The means 126, in addition to pressing the seed 26 into the soil 20, prevents bouncing of the seed 26. As can be seen in FIG. 3, the means 126, in the form of a wheel 140, has a peripheral surface 142 which blocks the seed 26 departing from the conduit 136 under pressure. The bottom end 144 of the conduit 136 is angled so that the departing seed 26 is propelled in a direction tangent to the wheel and effectively wedged into the soil 20 at the leading portion of the wheel 140.

A means at 146 can be provided to shield the conduit 136 and seed 26 from wind and residue in the path thereof. In this case, the shielding means 146 has a curved leading edge 148 and diverges in a trailing direction to distribute any intercepted residue to the sides of the slot 116.

To assure that the wheel 140 positively presses the seed 26 into the soil 20, a drive 150 can be provided therefor to rotate the wheel 140 about its axis 152, which axis 152 is substantially at right angles to the direction of travel of the mechanism 100. By driving the wheel 152, preferably at the speed of operation of the towing vehicle 108, sliding of the wheel 140 relative to the soil 20, as might cause repositioning of the seed 26, is avoided.

However, simpler versions of the means 126 can be utilized, as shown in FIG. 4. In FIG. 4, the means 126 as shown as a body 152 with a convex outer surface 154 that is preferably at least partially spherical so as not to hang up on soil or residue in the slot 116. FIG. 4 also shows a shielding means at 156 that is similar to the shoe 60 on the prior art device in FIG. 6. The shielding means 156 has a convex leading edge 158 and an undercut, curved deflecting surface 160 which intercepts seed 26 discharging from a shortened conduit 136' to route the discharged seed 26 in a curved path to the delivery point 114.

While the soil parting wheels 118, 120 effect a certain mount of residue cutting and resituation, in one form of the invention, additional residue resituating means are provided at 162. The residue resituating means 162 consists of a coulter wheel 164 that rotates about a horizontal axis 166 extending at substantially fight angles to the line of travel of the towing vehicle 108.

The residue resituating means 162 is made up of the wheel 164 and/or a cooperating pair of toothed wheels 168, 170, which are shown to straddle the trailing edge of the coulter wheel 164. The aforementioned TRASHWHEELS® residue resituating wheels can be used for the wheels 168, 170 and are preferably arranged to be rotatable about non-parallel axes 172, 174 which are non-horizontal and non-perpendicular to the line of movement of the towing vehicle. In a preferred form, the wheels 168, 170 diverge in the trailing direction and are toed in at their bottom portions.

With this arrangement, the coulter wheel 164 parts the soil 20 and breaks up residue that spans across the intended planting line. The toothed wheels 168, 170 laterally resituate residue downstream of the coulter wheel 164 and also loosen the soil 20 to provide a softened bed of soil 20 upstream of the wheels 118, 120. The wheels 118, 120 can then part the soil 20 to define a consistently shaped slot which serves as a receptacle for the seed 26, which is positively and consistently placed therein by the aforementioned structures.

In a preferred form, the delivery point 114 coincides with the fore and aft extent of the wheels 118, 120 to be shielded thereby.

For consistent seed placement, it is desired that the depth of the slot 116 be uniform. This is accomplished by providing gauge wheels 176, 178 for supporting the frame 102, which gauge wheels 176, 178 are preferably in fore and aft coincidence with the delivery point 114 and part, or all, of the wheels 118, 120. A preferred arrangement is shown in FIG. 2.

The linkages 106 can be constructed so that the mechanisms 100 effectively float relative to the drawing frame 104 and each other, as shown in FIG. 2. A conventional four bar linkage can be used to connect each of the mechanisms 100 to the drawing frame 104 in this fashion.

Another variation of the invention contemplates that a single hopper 180 be used to supply a plurality of the mechanisms 100, as shown in FIG. 5. In this case, the hopper 180 has a manifold arrangement including laterally spaced funneling chambers 182, 184, 186, 188, 190, 192, which communicate one each with a planting mechanism 100.

The foregoing disclosure of specific embodiments is intended to be illustrative of the broad concepts comprehended by the invention.

I claim:

1. A mechanism for continuously planting agricultural seed, said mechanism comprising:

a first frame to be drawn by a towing vehicle forwardly in a travel line, said first frame having an upstream end, a downstream end, and laterally spaced sides;

means on the first frame for directing seed from a bulk seed supply forcibly to a first delivery point adjacent to a surface on underlying soil into which seed is to be planted;

means on the first frame for pressing seed from said seed directing means into underlying soil adjacent to said first delivery point as said first frame moves forwardly; and first soil parting means comprising at least one rotatable disc on the first frame for defining a receptacle for seed at said delivery point, said at least one rotatable disc having an axis of rotation that is non-perpendicular to the travel line, wherein said seed pressing means includes a pressing wheel situated downstream of and adjacent to the first delivery point and having a peripheral surface to engage underlying soil at a location that is laterally aligned with the first delivery point, there further being means on the first frame for driving the pressing wheel in rotation independently of the direct engagement between the pressing wheel and the underlying soil as the first frame advances in a forward direction.

2. The agricultural seed planting mechanism according to claim 1 wherein the seed directing means includes a metering means for directing seed to the first delivery point at predetermined intervals.

3. The agricultural seed planting mechanism according to claim 1 wherein the seed directing means includes a conduit for communicating seed from the bulk seed supply to the first delivery point.

4. The agricultural seed planting mechanism according to claim 1 wherein the seed directing means includes a deflector plate located at least partially upstream of the pressing wheel and a conduit for communicating seed from the bulk seed supply hopper against the deflector plate for guided movement thereby to the first delivery point, the peripheral surface of the pressing wheel contacting underlying soil immediately downstream of the first delivery point.

5. The agricultural seed planting mechanism according to claim 1 wherein the bulk seed supply hopper is on the first frame and has an internal space for receiving a seed supply and the seed directing means includes a conduit for communicating seed away from the internal bulk seed supply space and means for pressurizing the internal bulk seed supply space to cause a forced movement of seed from the internal bulk seed supply space through the conduit to be wedged between the pressing wheel and underlying soil.

6. The agricultural seed planting mechanism according to claim 1 wherein the means for driving the pressing wheel drives the pressing wheel at a speed that varies in direct relationship to the forward speed of the first frame.

7. The agricultural seed planting mechanism according to claim 1 wherein the first soil parting means comprises first and second rotatable discs, with each said disc having an axis of rotation that is non-perpendicular to the travel line.

8. The agricultural seed planting mechanism according to claim 7 wherein the first and second rotatable discs have a fore and aft extent and the first delivery point lies within the fore and aft extent of said first and second rotatable discs.

9. The agricultural seed planting mechanism according to claim 1 wherein said agricultural seed planting mechanism further includes means on the first frame for continuously depositing soil over seed pressed into underlying soil as the frame moves in a forward direction.

10. The agricultural seed planting mechanism according to claim 1 wherein said agricultural seed planting mechanism further includes means on the first frame for clearing residue in underlying soil upstream of the at least one rotatable disc.

11. The agricultural seed planting mechanism according to claim 10 wherein the residue clearing means includes a first toothed wheel.

12. The agricultural seed planting mechanism according to claim 1 wherein said agricultural seed planting mechanism further includes a linkage for connecting the first frame to a drawing frame for floating movement relative thereto.

13. The agricultural seed planting mechanism according to claim 1 in combination with a second agricultural seed planting mechanism having a second frame, a second seed directing means, second seed pressing means and a second soil parting means and the second seed directing means directs seed from the bulk seed supply to a second delivery point, whereby a single bulk seed supply can be used to supply seed for direction to the first and second delivery points.

14. The agricultural seed planting mechanism according to claim 13 including first and second linkages for connecting the first and second frames to a drawing frame in such a manner that the first and second frames are movable independently of each other and relative to a drawing frame.

15. The agricultural seed planting mechanism according to claim 1 including first and second laterally spaced gauge wheels on the first frame for supporting the first frame at a predetermined height relative to underlying soil, wherein the pressing wheel resides laterally between the gauge wheels.

16. A mechanism for planting agricultural seed, such mechanism comprising:

a frame to be drawn by a towing vehicle in a forward direction;

means on the frame for continuously defining a seed receptacle in underlying soil as the frame is towed in a forward direction;

means on the frame for directing seed from a supply to a delivery point in the seed receptacle adjacent to a surface on said underlying soil into which seed is to be planted;

means on the frame upstream of the delivery point for shielding seed directed to the delivery point by the seed directing means;

means on the frame upstream of the shielding means for cutting and clearing residue in an intended line along which seed is to be pressed into said underlying soil as the frame is advanced in a forward direction;

a rotating wheel being situated on the frame adjacent to and downstream of said delivery point and having a peripheral surface to engage said underlying soil at a location that is laterally aligned with the delivery point, said peripheral surface pressing seed from the seed directing means into said underlying soil adjacent to the delivery point; and means for driving the wheel in rotation as the frame advances in a forward direction.

17. The agricultural seed planting mechanism according to claim 16 wherein the seed directing means comprises means for directing seed from a supply under pressure at predetermined intervals.

18. The agricultural seed planting mechanism according to claim 16 wherein the residue cutting and clearing means includes first and second cooperating discs.

19. The agricultural seed planting mechanism according to claim 16 wherein the residue cutting and clearing means includes at least one disc.

20. The agricultural seed planting mechanism according to claim 19 wherein the residue cutting and clearing means includes at least a second disc upstream of said at least one disc.

21. A mechanism for continuously planting agricultural seed, said mechanism comprising:

a frame to be drawn by a towing vehicle forwardly in a travel line, said frame having an upstream end, a downstream end, and laterally spaced sides;

means on said frame for directing said seed from a bulk seed supply forcibly to a delivery point adjacent to a surface on underlying soil into which said seed is to be planted;

soil parting means including at least one rotatable disc on said frame for defining a receptacle for said seed at said delivery point, said at least one rotatable disc having an axis of rotation that is non-perpendicular to said travel line;

means on said frame for pressing said seed from said seed directing means into said underlying soil adjacent to said delivery point as said frame advances forwardly, said seed pressing means including a pressing wheel situated downstream of said delivery point and having a peripheral surface to engage said seed; and means on said frame for driving said pressing wheel in rotation independently of the direct engagement between said pressing wheel and said underlying soil as said frame advances forwardly.

22. The agricultural seed planting mechanism according to claim 21, wherein said seed directing means includes a metering means for directing seed to said delivery point at predetermined intervals.

23. The agricultural seed planting mechanism according to claim 21, wherein said seed directing means includes a conduit for communicating seed from said bulk seed supply to said delivery point.

24. The agricultural seed planting mechanism according to claim 21, wherein said seed directing means includes a deflector plate located at least partially upstream of said pressing wheel and a conduit for communicating seed from said bulk seed supply against said deflector plate to said delivery point.

25. The agricultural seed planting mechanism according to claim 21, wherein said bulk seed supply is on said frame and has an internal space for receiving a seed supply, and said seed directing means includes a conduit for communicating seed away from said internal space and means for pressurizing said internal space to cause a forced movement of said seed from said internal space, through said conduit and into wedged engagement between said pressing wheel and said underlying soil.

26. The agricultural seed planting mechanism according to claim 21, further including means on said frame for continuously depositing soil over said seed pressed into said underlying soil by said pressing wheel as said frame moves in a forward direction.

27. The agricultural seed planting mechanism according to claim 21, further including means on said frame for clearing residue in said underlying soil, said residue clearing means at least partially upstream of said soil parting means.

28. The agricultural seed planting mechanism according to claim 21, further including first and second laterally spaced gauge wheels on said frame for supporting said frame at a predetermined height relative to said underlying soil, wherein said pressing wheel resides laterally between said first and second gauge wheels.

29. A mechanism for continuously planting agricultural seed, said mechanism comprising:

a frame to be drawn by a towing vehicle forwardly in a travel line;

means on said frame for directing said seed from a bulk seed supply forcibly to a delivery point adjacent to a surface on underlying soil into which said seed is to be planted;

soil parting means including at least one rotatable disc on said frame for defining a receptacle for said seed at said delivery point, said at least one rotatable disc having an axis of rotation that is non-perpendicular to said travel line;

means on said frame for contacting and pressing said seed into said underlying soil adjacent to said delivery point immediately after said seed directing means has deposited said seed at said delivery point, said seed pressing means including a pressing wheel situated downstream of said delivery point and having a peripheral surface to engage said underlying soil adjacent said delivery point; and means on said frame for driving said pressing wheel in rotation independently of the direct engagement between said pressing wheel and said underlying soil as said frame advances forwardly.

30. A method for planting agricultural seed into soil, said method comprising the steps:

parting said soil with at least one rotatable disc to continuously form a seed receptacle into which said seed is planted, said at least one rotatable disc having an axis of rotation that is non-perpendicular to a travel line of said at least one rotatable disc;

directing said seed from a bulk seed supply to a delivery point within said seed receptacle;

pressing said seed into soil adjacent said delivery point within said seed receptacle with a pressing wheel immediately after directing said seed to said delivery point;

applying drive power to said pressing wheel to rotate said pressing wheel independent of the movement imparted on said wheel due to engagement with said soil; and closing said seed receptacle after pressing said seed into said soil.

31. The method of claim 30, wherein said step of pressing said seed into said soil includes the step of directly contacting said seed with said pressing wheel immediately after said seed reaches said delivery point.

32. The method of claim 30, wherein said step of directing said seed to a delivery point includes the step of applying pressure to a region of said bulk seed supply to force said seed into a conduit guiding said seed from said bulk seed supply to said delivery point.

33. The method of claim 32, further including the step of providing a structure upstream of said conduit to shield said conduit.

* * * * *